US012051865B2

(12) United States Patent
Morgan

(10) Patent No.: US 12,051,865 B2
(45) Date of Patent: Jul. 30, 2024

(54) SOCKET CONNECTOR

(71) Applicant: TE Connectivity Services GmbH, Schaffhausen (CH)

(72) Inventor: Chad William Morgan, Carneys Point, NJ (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 100 days.

(21) Appl. No.: 17/563,473

(22) Filed: Dec. 28, 2021

(65) Prior Publication Data

US 2023/0208058 A1 Jun. 29, 2023

(51) Int. Cl.
*H01R 12/71* (2011.01)
*H01R 13/24* (2006.01)
*H01R 13/6471* (2011.01)

(52) U.S. Cl.
CPC ....... *H01R 12/716* (2013.01); *H01R 13/2435* (2013.01); *H01R 13/6471* (2013.01)

(58) Field of Classification Search
CPC ............ H01R 13/2435; H01R 13/6471; H01R 13/6597; H01R 13/6588; H01R 12/716; H01R 12/714; H01R 12/55; H01R 12/58
USPC ................... 439/733.1, 862, 66, 65, 74, 591
See application file for complete search history.

(56) References Cited

U.S. PATENT DOCUMENTS 5,174,763 A * 12/1992 Wilson ............... H01R 13/2421 439/840
5,376,009 A * 12/1994 Olsson ................ H01R 12/775 361/801
5,395,252 A * 3/1995 White .................. H01R 12/714 439/591
6,241,531 B1 * 6/2001 Roath .................. H01R 12/714 439/591
6,843,659 B2 * 1/2005 Liao ..................... H05K 7/1069 439/66
6,872,082 B2 * 3/2005 Hsu .................... H01R 13/2457 439/91
6,877,992 B2 * 4/2005 Grant ..................... H01R 12/52 439/91
6,957,964 B2 * 10/2005 Chiang .............. H01R 13/2435 439/862

(Continued)

FOREIGN PATENT DOCUMENTS

KR 101393601 B1 5/2014
KR 101959536 B1 3/2019

(Continued)

*Primary Examiner* — Marcus E Harcum

(57) ABSTRACT

A socket connector includes a substrate having an upper surface and a lower surface. The substrate has a ground plane between the upper surface and the lower surface. The substrate includes contact channels between the upper and lower surfaces. The socket connector includes socket contacts received in corresponding contact channels. Each socket contact includes a contact body, an upper mating element, and a lower mating element. The upper mating element is deflectable relative to the contact body and extends to the upper surface to interface with a first electrical component. The lower mating element is deflectable relative to the contact body and extends to the lower surface to interface with a second electrical component. A plurality of the socket contacts are electrically connected to the ground plane.

20 Claims, 7 Drawing Sheets

(56) References Cited

U.S. PATENT DOCUMENTS 6,976,888 B2 * 12/2005 Shirai ................ H01R 13/2442 439/862
6,994,566 B2 * 2/2006 You .................... H01R 13/2442 439/862
7,254,889 B1 * 8/2007 Cherian ................. H01R 12/89 324/755.05
7,297,003 B2 * 11/2007 Rathburn ........... H01R 13/2414 439/591
7,341,485 B2 * 3/2008 Polnyi ................ H01R 13/2435 439/862
7,391,227 B2 6/2008 Inoue et al.
7,393,471 B2 7/2008 Inoue et al.
7,442,045 B1 * 10/2008 Di Stefano ............ H01R 12/58 439/82
7,467,949 B2 * 12/2008 Liao ....................... H01R 12/52 439/66
7,479,014 B2 * 1/2009 Hougham ............ H05K 3/4007 439/91
7,632,106 B2 * 12/2009 Nakamura ........... G01R 1/0466 439/71
7,726,984 B2 6/2010 Bumb, Jr. et al.
7,821,283 B2 10/2010 Yamada et al.
7,878,817 B2 * 2/2011 Lin .................... H01R 13/2435 439/66
7,887,336 B2 * 2/2011 Nikaido ............ H01L 23/49827 439/91
8,033,835 B2 * 10/2011 Mulfinger ............ H05K 7/1439 439/91
8,277,256 B2 * 10/2012 Ju ...................... H01R 13/6588 439/626
8,491,337 B2 * 7/2013 Cai .................... H01R 13/2407 439/66
9,048,591 B2 * 6/2015 Chang ................ H01R 13/6597
9,472,887 B1 * 10/2016 Horning ............. H01R 13/6471
9,491,881 B2 * 11/2016 Heppner .............. H05K 7/1069
10,454,218 B2 * 10/2019 Hsu ...................... H01R 13/428
10,700,454 B1 * 6/2020 Blackburn ............. H01R 11/28
11,245,209 B2 * 2/2022 Hsu .................... H01R 13/2485
11,569,618 B2 * 1/2023 Ito ...................... H01R 13/6594
2005/0245106 A1 * 11/2005 Ma ......................... H01R 12/52 439/66
2008/0239683 A1 * 10/2008 Brodsky ................ H01R 12/52 29/854
2009/0186495 A1 * 7/2009 Taylor .................... H01R 12/91 29/747
2011/0151688 A1 * 6/2011 Beaman ............. H01R 13/2407 439/66
2014/0162472 A1 * 6/2014 Walden ................ H01R 12/714 439/66
2014/0220797 A1 * 8/2014 Rathburn ........... H01R 13/2442 29/846
2017/0069986 A1 * 3/2017 Horning ............. H01R 12/7076
2018/0366881 A1 * 12/2018 Chang .................... H01R 13/41
2019/0131746 A1 * 5/2019 Morgan ............. H01R 13/6584
2019/0237907 A1 * 8/2019 Wagner .............. H01R 13/2442
2020/0150148 A1 5/2020 Chung
2020/0381841 A1 * 12/2020 Chen .................... H01Q 21/065
2021/0313726 A1 * 10/2021 Huang ................. H01R 13/514

FOREIGN PATENT DOCUMENTS

KR 102113732 B1 5/2020
TW 202025558 A * 7/2020 ........... H01R 12/714

* cited by examiner

SOCKET CONNECTOR

BACKGROUND OF THE INVENTION

The subject matter herein relates generally to data communication systems.

Electrical interconnects are used to connect two opposing electronic devices. For instance, electrical interconnects may be provided between two circuit boards or a circuit board and another electronic device or pluggable module to transmit data and/or power therebetween. Some known electrical interconnects use dual compression socket connectors to define separable mating interfaces at both the upper interface and the lower interface for repeated mating and unmating of the components. As the data rates of communication systems increase, conventional electrical interconnects are unable to meet the demands for electrical performance of the systems.

A need remains for a socket connector that can perform at higher data rates than conventional interconnects in a reliable manner.

BRIEF DESCRIPTION OF THE INVENTION

In one embodiment, a socket connector is provided and includes a substrate having an upper surface and a lower surface. The substrate has a ground plane between the upper surface and the lower surface. The substrate includes contact channels between the upper and lower surfaces. The socket connector includes socket contacts received in corresponding contact channels. Each socket contact includes a contact body, an upper mating element, and a lower mating element. The upper mating element is deflectable relative to the contact body and extends to the upper surface to interface with a first electrical component. The lower mating element is deflectable relative to the contact body and extends to the lower surface to interface with a second electrical component. A plurality of the socket contacts are electrically connected to the ground plane.

In another embodiment, a socket connector is provided and includes a substrate having an upper surface and a lower surface. The substrate has a ground plane between the upper surface and the lower surface. The substrate includes contact channels between the upper and lower surfaces. The socket connector includes ground socket contacts received in corresponding contact channels. Each ground socket contact includes a contact body, an upper mating element, a lower mating element, and a grounding element. The grounding element extends from the contact body to interface with the ground plane. The upper mating element is deflectable relative to the contact body and extends to the upper surface to interface with a first electrical component. The lower mating element is deflectable relative to the contact body and extends to the lower surface to interface with a second electrical component. The ground plane electrically commons the ground socket contacts.

In a further embodiment, a socket connector is provided and includes a substrate having a ground plane, an upper substrate portion above the ground plane, and a lower substrate portion below the ground plane. The upper substrate portion has an upper surface configured to face a first electrical component. The lower substrate portion has a lower surface configured to face a second electrical component. The substrate includes signal channels therethrough and ground channels therethrough. The socket connector includes signal socket contacts received in corresponding signal channels. Each signal socket contact includes a signal contact body, an upper signal mating element, and a lower signal mating element. The signal contact body is coupled to at least one of the upper substrate portion and the lower substrate portion. The upper signal mating element is deflectable relative to the contact body and extends to the upper surface to interface with the first electrical component. The lower signal mating element is deflectable relative to the contact body and extends to the lower surface to interface with the second electrical component. The socket connector includes ground socket contacts received in corresponding ground channels. Each ground socket contact includes a ground contact body, an upper ground mating element, and a lower ground mating element. The ground contact body is electrically connected to the ground plane. The upper ground mating element is deflectable relative to the contact body and extends to the upper surface to interface with the first electrical component. The lower ground mating element is deflectable relative to the contact body and extends to the lower surface to interface with the second electrical component.

DETAILED DESCRIPTION OF THE INVENTION

Figure 1:
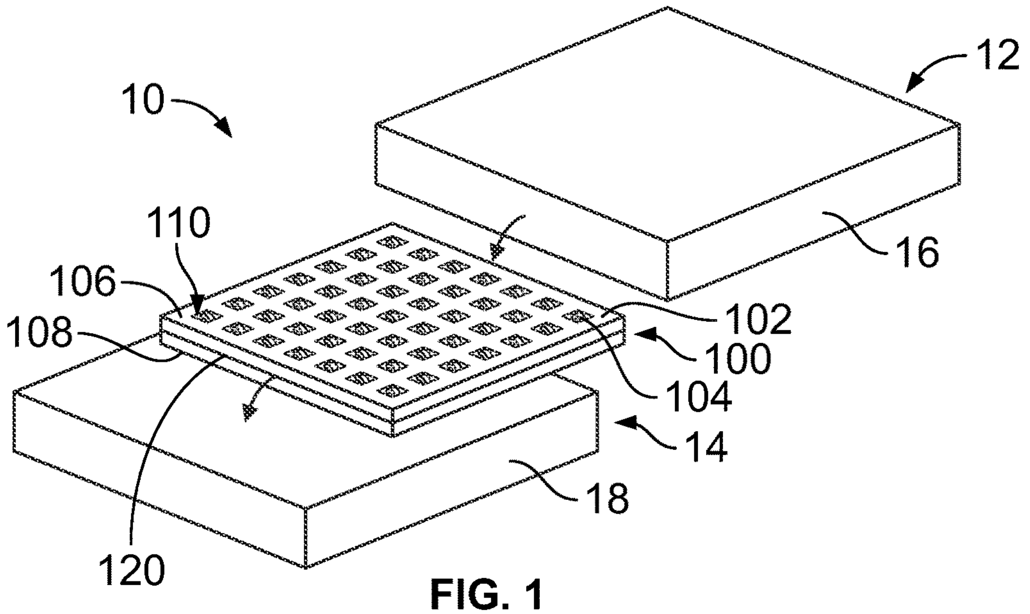
FIG. 1 illustrates an electronic assembly including a socket connector in accordance with an exemplary embodiment.

FIG. 1 illustrates an electronic assembly 10 including a socket connector 100 in accordance with an exemplary embodiment. The socket connector 100 is used to electrically connect a first electrical component 12 and a second electrical component 14. In an exemplary embodiment, the first electrical component 12 includes a first circuit board 16 and the second electrical component 14 includes a second circuit board 18. The socket connector 100 is an interposer between the first circuit board 16 and the second circuit board 18. The socket connector 100 is electrically connected between the first circuit board 16 and the second circuit board 18. In an exemplary embodiment, the socket connector 100 is compressible between the first circuit board 16 and the second circuit board 18. The socket connector 100 includes a dual compressive interface that is compressible against the first circuit board 16 and compressible against the second circuit board 18. In various embodiments, the first circuit board 16 may be part of an electrical component, such as a chip, an ASIC, a processor, a memory module or other component.

The socket connector 100 includes a substrate 102 holding a plurality of socket contacts 104. In an exemplary embodiment, the socket contacts 104 are stamped and formed contacts. The substrate 102 extends between an upper surface 106 and a lower surface 108. The socket contacts 104 are received in corresponding contact channels 110 to pass through the substrate 102 between the upper surface 106 and the lower surface 108. In an exemplary embodiment, the substrate 102 is a layered structure including at least one ground plane 120. The ground plane(s) 120 is used to improve electrical performance of the socket connector 100. The ground plane(s) 120 increases resonant frequencies occurring in insertion loss, return loss, near-end crosstalk, far-end crosstalk, and the like beyond a target frequency, such as 60 GHz, to improve electrical performance of the socket connector 100. The ground plane 120 is used to electrically common a subset of the socket contacts 104, namely the ground socket contacts, and an intermediary location remote from the first electrical component 12 and remote from the second electrical component 14. The ground plane 120 may be approximately centered between the first and second electrical components 12, 14 and thus approximately centered between the ground planes of the first and second electrical components 12, 14. In an exemplary embodiment, the ground plane 120 is an internal ground plane located at an internal layer of the substrate 102. Additionally, ground planes 120 may be provided at the upper surface 106 and/or the lower surface 108.

Figure 2:
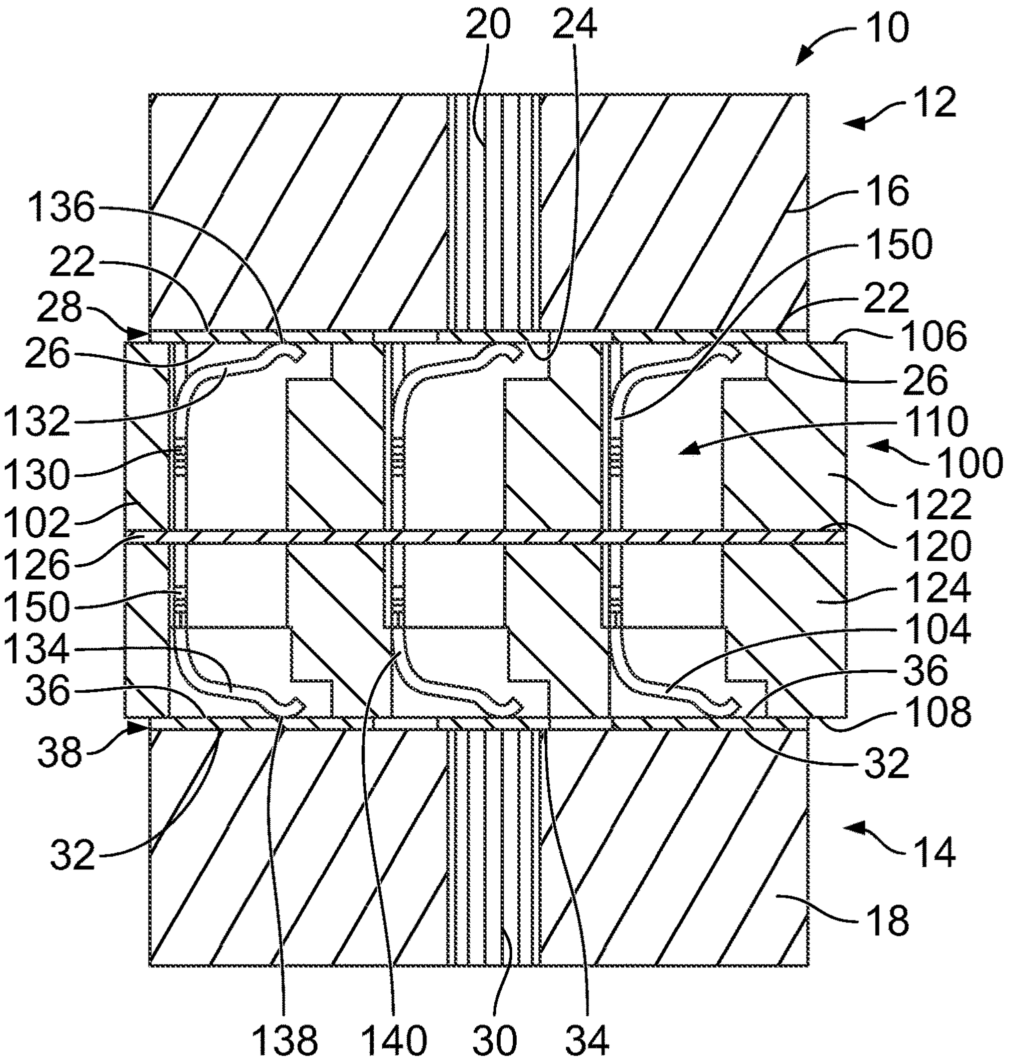
FIG. 2 is a cross-sectional view of the electronic assembly in accordance with an exemplary embodiment showing the socket connector connected between the first and second electrical components.
Figure 3:
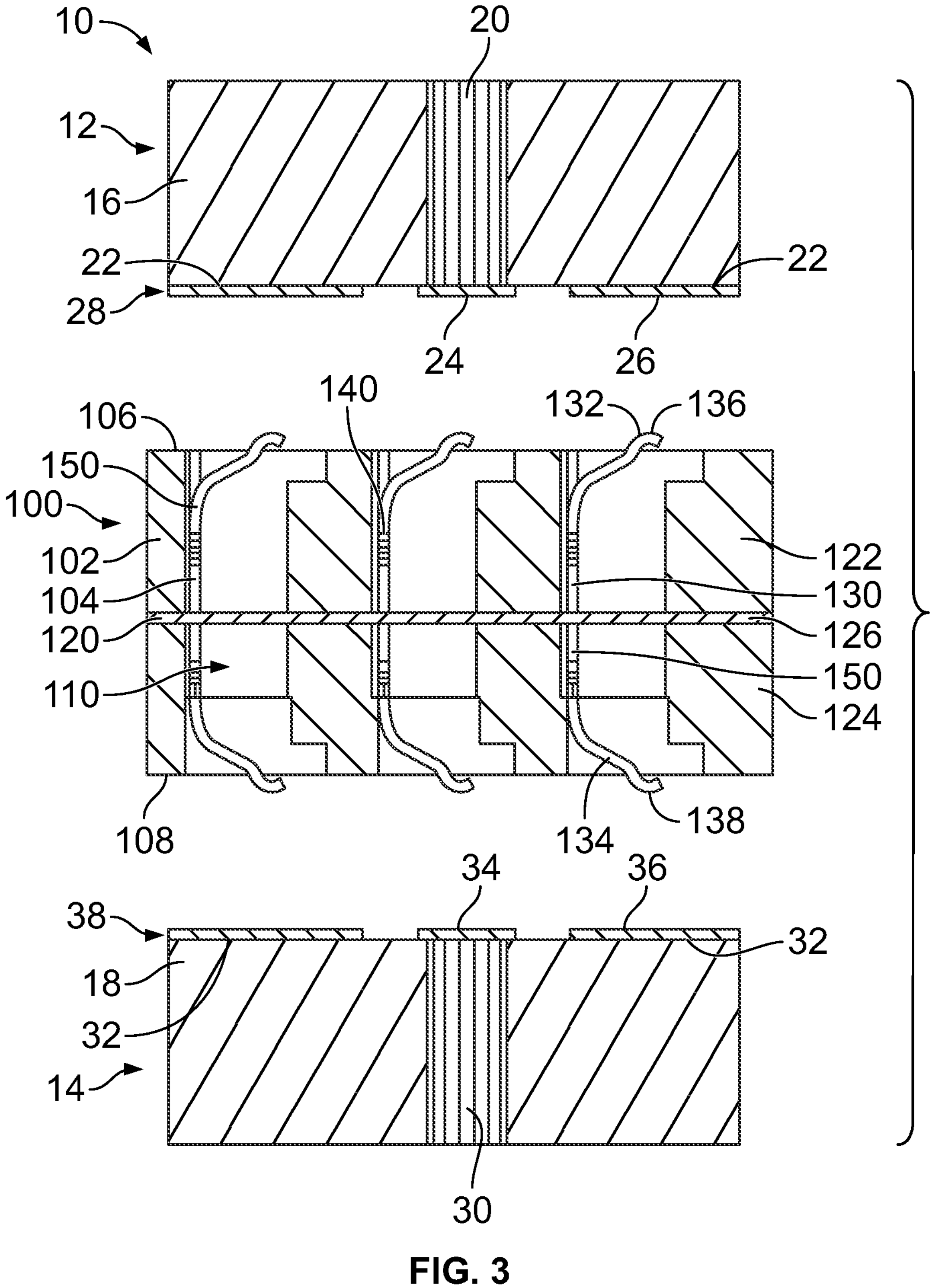
FIG. 3 is an exploded view of the electronic assembly in accordance with an exemplary embodiment.

FIG. 2 is a cross-sectional view of the electronic assembly 10 in accordance with an exemplary embodiment showing the socket connector 100 connected between the first and second electrical components 12, 14. FIG. 3 is an exploded view of the electronic assembly 10 in accordance with an exemplary embodiment. In an exemplary embodiment, the first electrical component 12 includes the first circuit board 16 and the second electrical component 14 includes the second circuit board 18. During assembly, the socket connector 100 is stacked between the first and second electrical components 12, 14 to electrically connect the first and second circuit boards 16, 18.

The first circuit board 16 is located above the socket connector 100 and may be referred to hereinafter as upper circuit board 16. The upper circuit board 16 includes upper signal contacts 20 and upper ground contacts 22. The upper signal contacts 20 are defined by one or more circuits of the upper circuit board 16, such as traces, vias, pads, and the like. In an exemplary embodiment, the upper signal contact 20 includes a signal contact pad 24 at the bottom surface of the upper circuit board 16 configured to be electrically connected to the corresponding socket contact 104 of the socket connector 100. The upper ground contacts 22 are defined by one or more circuits of the upper circuit board 16, such as traces, vias, pads, and the like. In an exemplary embodiment, the upper ground contact 22 includes a ground contact pad 26 at the bottom surface of the upper circuit board 16 configured to be electrically connected to the corresponding socket contact 104 of the socket connector 100. In an exemplary embodiment, the upper circuit board 16 includes an upper ground plane 28 electrically connecting each of the upper ground contacts 22. In various embodiments, the upper ground plane 28 may be provided at the bottom surface of the upper circuit board 16. Optionally, multiple upper ground planes 28 may be provided at different layers of the upper circuit board 16.

The second circuit board 18 is located below the socket connector 100 and may be referred to hereinafter as lower circuit board 18. The lower circuit board 18 includes lower signal contacts 30 and lower ground contacts 32. The lower signal contacts 30 are defined by one or more circuits of the lower circuit board 18, such as traces, vias, pads, and the like. In an exemplary embodiment, the lower signal contact 30 includes a signal contact pad 34 at the top surface of the lower circuit board 18 configured to be electrically connected to the corresponding socket contact 104 of the socket connector 100. The lower ground contacts 32 are defined by one or more circuits of the lower circuit board 18, such as traces, vias, pads, and the like. In an exemplary embodiment, the lower ground contact 32 includes a ground contact pad 36 at the top surface of the lower circuit board 18 configured to be electrically connected to the corresponding socket contact 104 of the socket connector 100. In an exemplary embodiment, the lower circuit board 18 includes a lower ground plane 38 electrically connecting each of the lower ground contacts 32. In various embodiments, the lower ground plane 38 may be provided at the top surface of the lower circuit board 18. Optionally, multiple lower ground planes 38 may be provided at different layers of the lower circuit board 18.

The socket connector 100 includes the substrate 102 and the socket contacts 104. In an exemplary embodiment, the socket contacts 104 are stamped and formed contacts configured to be stitched, pressed, or otherwise loaded into the corresponding contact channels 110 of the substrate 102. The socket contacts 104 extend to the upper surface 106 to interface with the upper circuit board 16 and extend to the lower surface 108 to interface with the lower circuit board 18. In an exemplary embodiment, the socket contacts 104 have separable mating interfaces at the upper and lower ends to interface with the upper and lower circuit boards 16, 18. The socket contacts 104 are compressible such that the upper and lower ends of the socket contacts 104 are deflected when interfacing with the upper and lower circuit boards 16, 18. As such, the socket contacts 104 are spring biased against the upper and lower circuit boards 16, 18 to maintain electrical connection with the upper and lower circuit boards 16, 18.

In an exemplary embodiment, the substrate 102 is a layered structure having the ground plane 120 between an upper dielectric layer 122 and a lower dielectric layer 124. Optionally, the upper dielectric layer 122 may have a height approximately equal to a height of the lower dielectric layer 124 such that the ground plane 120 is centered between the upper surface 106 and the lower surface 108. In an exemplary embodiment, the layered structure of the substrate 102 is a sandwich of one stamped piece and two molded pieces, which may be laminated together or secured together using epoxy or adhesive. In an exemplary embodiment, the dielectric layers 122, 124 are molded layers, such as from a molded polymer material. The dielectric layers 122, 124 may be nylon, LCP, PBT, and the like. The dielectric layers 122, 124 may use glass reinforcement fibers, which may be in a random orientation. In an exemplary embodiment, the ground plane 120 includes a metal plate or a metal film 126. The metal plate may have a thickness of between approximately 2.0 and 6.0 mils. The metal plate may be manufactured from brass, bronze, CuNiSi, BeCu, and the like. The ground plane 120 may be stamped and formed in various embodiments. In an exemplary embodiment, the ground plane 120 is planar and oriented horizontally. The ground plane 120 may extend parallel to the upper surface 106 and/or the lower surface 108. In various embodiments, the ground plane 120 is laminated between the dielectric layers 122, 124. In an exemplary embodiment, adhesive may be used between the ground plane 120 and the dielectric layers 122, 124 to form the substrate 102. The ground plane 120 may be secured to the dielectric layers 122, 124 by other means or processes in alternative embodiments.

In an exemplary embodiment, the socket contacts 104 are stamped and formed contacts. Each socket contact 104 includes a contact body 130, an upper mating element 132 extending from the top of the contact body 130, and a lower mating element 134 extending from the bottom of the contact body 130. The mating elements 132, 134 are deflectable relative to the contact body 130. The contact body 130 is configured to be stitched or otherwise loaded into the substrate 102. The contact body 130 may be secured to the upper dielectric layer 122 and/or the lower dielectric layer 124. For example, barbs or other features may engage the dielectric layers 122, 124 to hold the socket contact 104 in the substrate 102 by an interference fit. The upper mating element 132 extends to the upper surface 106 to interface with the first electrical component 12. The upper mating element 132 includes an upper mating interface 136 configured to engage the upper circuit board 16 (for example, to engage the corresponding contact pad at the bottom of the upper circuit board 16). The lower mating element 134 extends to the lower surface 108 to interface with the second electrical component 14. The lower mating element 134 includes a lower mating interface 138 configured to engage the lower circuit board 18 (for example, to engage the corresponding contact pad at the top of the lower circuit board 18).

In an exemplary embodiment, the upper mating element 132 is an upper mating beam and may be referred to hereinafter as an upper mating beam 132. In an exemplary embodiment, the lower mating element 134 is a lower mating beam and may be referred to hereinafter as a lower mating beam 134. The mating beams 132, 134 may be deflectable spring beams. However, other types of mating elements may be used in alternative embodiments. For example, the socket contacts 104 may be conductive elastomeric columns having upper portions defining the upper mating elements 132 and lower portions defining the lower mating elements 134.

In an exemplary embodiment, the socket contacts 104 include signal socket contacts 140 and ground socket contacts 150. The signal socket contacts 140 are configured to be electrically connected to corresponding signal contacts 20, 30 of the upper and lower circuit boards 16, 18. The ground socket contacts 150 are configured to be electrically connected to corresponding ground contacts 22, 32 of the upper and lower circuit boards 16, 18. The ground socket contacts 150 provide electrical shielding for the signal socket contacts 140. In various embodiments, the signal socket contacts 140 are arranged in pairs. The ground socket contacts 150 surround corresponding pairs of the signal socket contacts 140. The ground socket contacts 150 are electrically connected to the ground plane 120. The ground plane 120 is used to electrically common the ground socket contacts 150.

In an exemplary embodiment, each of the ground socket contacts 150 are electrically commoned at the upper ground plane 28, at the lower ground plane 38, and at the internal or intermediate ground plane 120 of the socket connector 100. The socket connector ground plane 120 shortens the grounded electrical paths between the ground planes. For example, the lengths of the grounded electrical paths may be approximately cut in half by centering the ground plane 120 between the upper ground plane 28 and the lower ground plane 38 (for example, compared to an electronic assembly utilizing a socket connector that does not include a ground plane). Electrical performance is enhanced with the inclusion of the ground plane 120. For example, the ground plane 120 increases resonant frequencies occurring in insertion loss, return loss, near-end crosstalk, far-end crosstalk, and the like beyond a target frequency, such as 60 GHz, to improve electrical performance of the socket connector 100.

Figure 4:
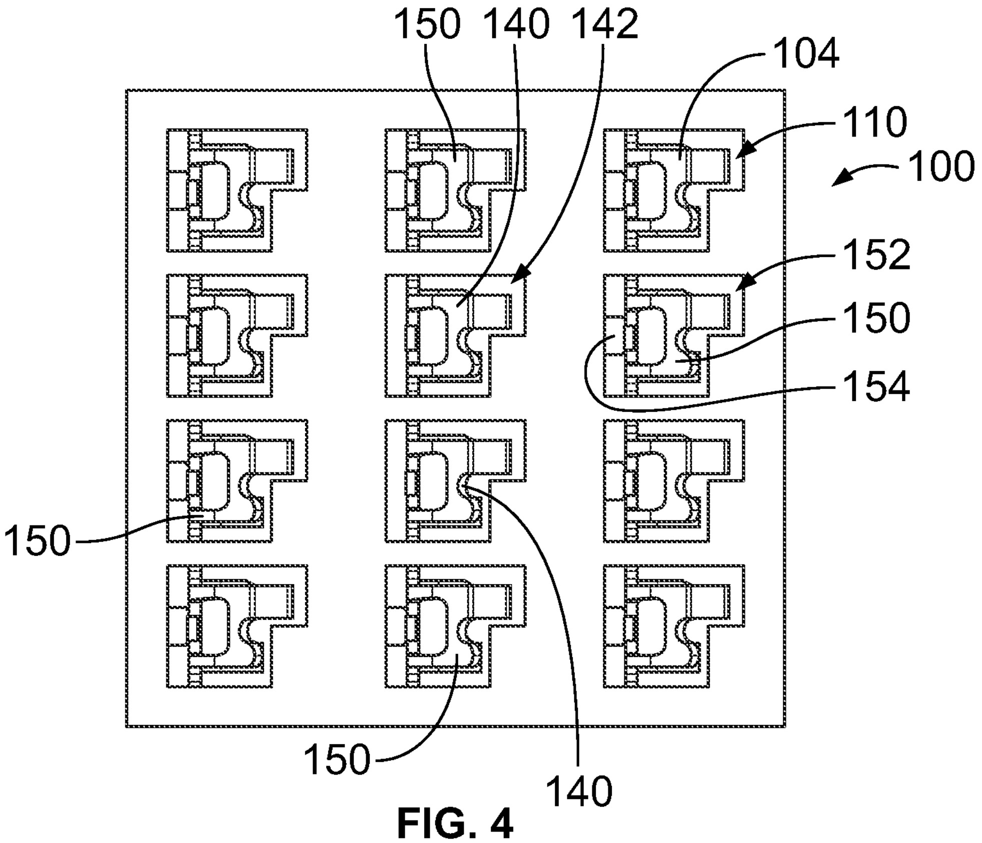
FIG. 4 is a top view of a portion of the socket connector in accordance with an exemplary embodiment.

FIG. 4 is a top view of a portion of the socket connector 100 in accordance with an exemplary embodiment. FIG. 4 illustrates an array of the socket contacts 104 showing the socket contacts 104 in a plurality of rows and a plurality of columns. FIG. 4 illustrates a ring of ground socket contacts 150 surrounding a pair of signal socket contacts 140. For example, the ground socket contacts 150 are located in front of, behind, and on both sides of the pair of signal socket contacts 140. The ground socket contacts 150 electrically isolate each pair of signal socket contacts 140 from every other pair of the signal socket contacts 140.

The socket contacts 104 are received in corresponding contact channels 110. The contact channels 110 pass through the upper and lower dielectric layers 122, 124 and pass through the ground plane 120 (shown in FIGS. 2 and 3). In an exemplary embodiment, the contact channels 110 include signal contact channels 142 that receive corresponding signal socket contacts 140 and ground contact channels 152 that receive corresponding ground socket contacts 150. In the illustrated embodiment, the signal contact channels 142 are aligned in the rows and the columns with the ground contact channels 152 to position the signal socket contacts 140 in the rows and columns with the ground socket contacts 150.

In an exemplary embodiment, the ground plane 120 includes connecting tabs 154 that extend into the ground contact channels 152 to interface with the ground socket contacts 150. In an exemplary embodiment, the signal contact channels 142 do not include such connecting tabs thus isolating the signal socket contacts 140 from the ground plane 120.

Figure 5:
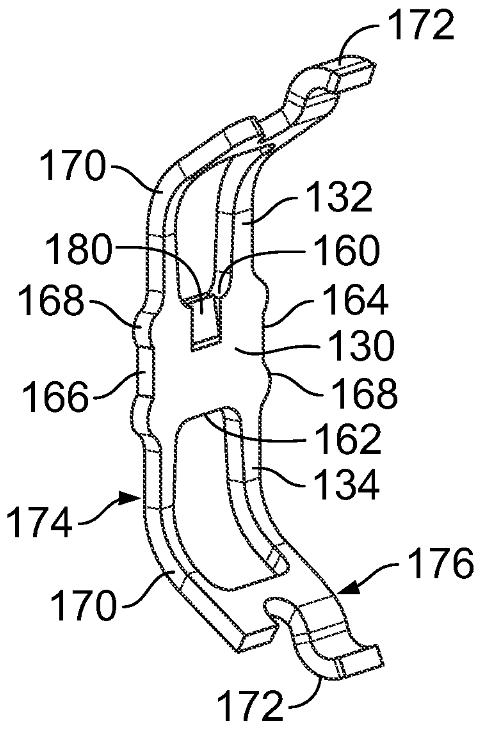
FIG. 5 is a front perspective view of the socket contact in accordance with an exemplary embodiment.
Figure 6:
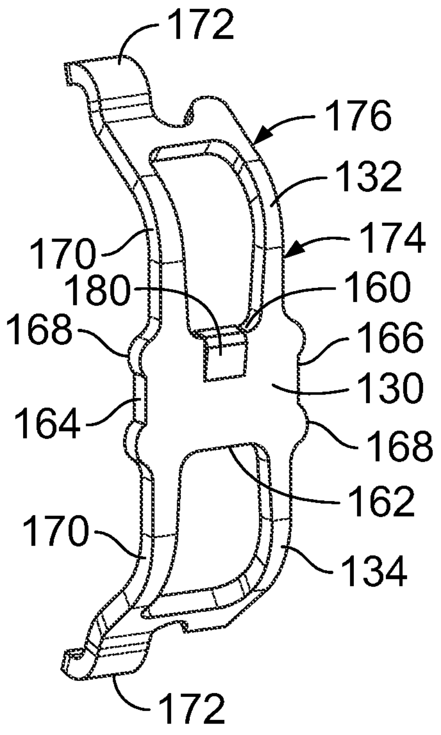
FIG. 6 is a rear perspective view of the socket contact in accordance with an exemplary embodiment.

FIG. 5 is a front perspective view of the socket contact 104 in accordance with an exemplary embodiment. FIG. 6 is a rear perspective view of the socket contact 104 in accordance with an exemplary embodiment. In various embodiments, the signal socket contacts 140 and the ground socket contacts 150 are identical and the socket contact 104 illustrated in FIGS. 5 and six is illustrative of the signal socket contact 140 and the ground socket contacts 150. However, in alternative embodiments, the signal socket contacts 140 and/or the ground socket contacts 150 may include different components or features.

The socket contact 104 is a stamped and formed contact stamped from a metal plate or blank material and then formed into a predetermined shape. The socket contact 104 includes the contact body 130 and the upper and lower mating beams 132, 134 extending from the contact body 130. The contact body 130 may be approximately centered along the socket contact 104. For example, the upper and lower mating beams 132, 134 may have similar sizes and/or shapes. The mating beams 132, 134 are cantilevered from the contact body 130 and are deflectable relative to the main contact body 130.

The contact body 130 includes a top 160, a bottom 162, and opposite sides 164, 166. In an exemplary embodiment, the contact body 130 includes barbs 168 extending from the sides 164, 166. The barbs 168 are used to secure the socket contact 104 in the substrate 102 (shown in FIG. 4). In the illustrated embodiment, the barbs 168 are rounded protrusions. The barbs 168 may have other shapes in alternative embodiments, such as triangular shapes configured to pierce or cut into the dielectric material of the substrate 102.

Each mating beam 132, 134 includes an arm 170 and a finger 172 extending from the arm 170. The finger 172 defines a mating interface configured to be mated with the corresponding circuit board. The arm 170 is deflectable. In various embodiments, and the inner portion 174 of the arm 170 is generally coplanar with the contact body 130 and an outer portion 176 of the arm 170 is nonplanar with the contact body 130, such as being angled in a forward direction. The finger 172 extends from the outer portion 176 of the arm 170. The mating beams 132, 134 may have other shapes in alternative embodiments.

In an exemplary embodiment, the contact body 130 includes a connecting tab 180. The connecting tabs 180 is configured to be electrically connected to the ground plane 120 (shown in FIG. 4). For example, the connecting tabs 180 may interface with the connecting tab 154 (see, for example, FIG. 4) of the ground plane 120. In an exemplary embodiment, the connecting tabs 180 directly engage the ground plane, such as at the connecting tab 154. In various embodiments, the connecting tab 180 is deflectable. For example, the connecting tabs 180 may be stamped from the contact body 130 and angled outward of claim relative to the contact body 130. For example, the connecting tabs 180 may be angled rearward to interface with the connecting tab 154. In various embodiments, the connecting tabs 180 is only formed on the ground socket contacts 150 and is not included on the signal socket contacts 140. However, in alternative embodiments, both the signal and ground socket contacts 140, 150 include the connecting tabs 180 but the connecting tabs 180 on the signal socket contacts 140 do not interface with and a portion of the ground plane 120 (for example, the ground plane 120 does not include any connecting tabs 154 at the signal socket contacts 140).

Figure 7:
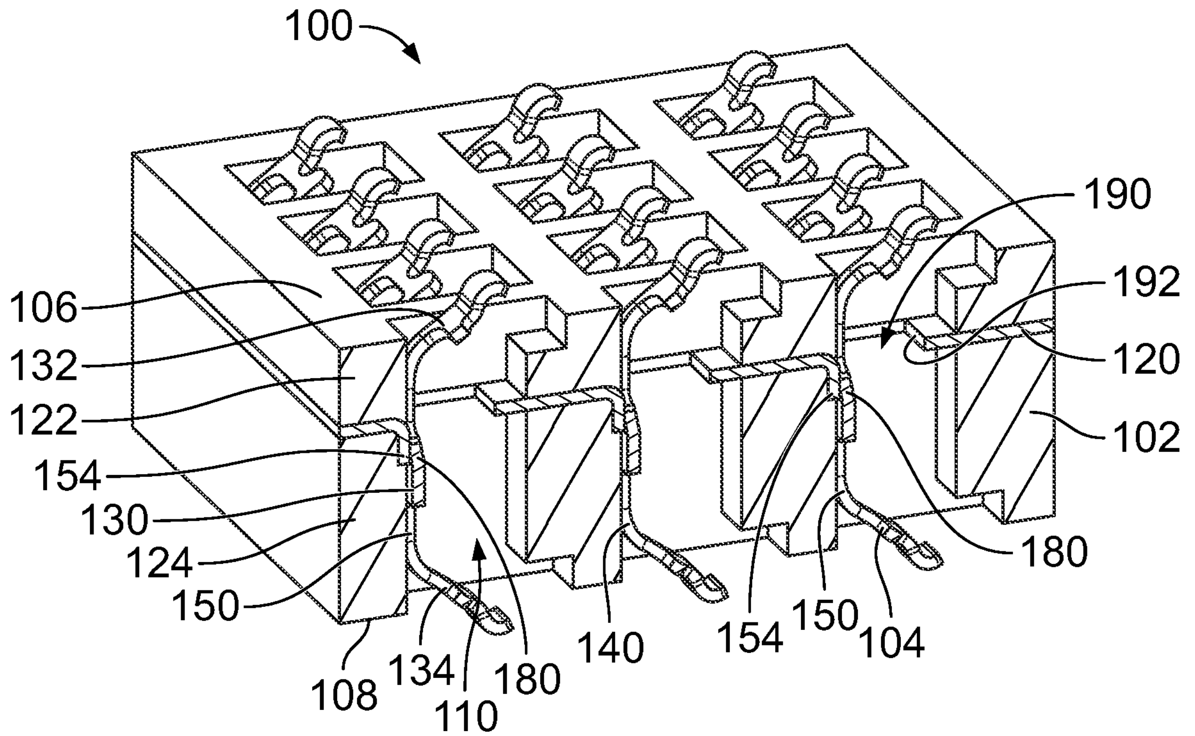
FIG. 7 is a perspective, partial sectional view of a portion of the socket connector in accordance with an exemplary embodiment.
Figure 8:
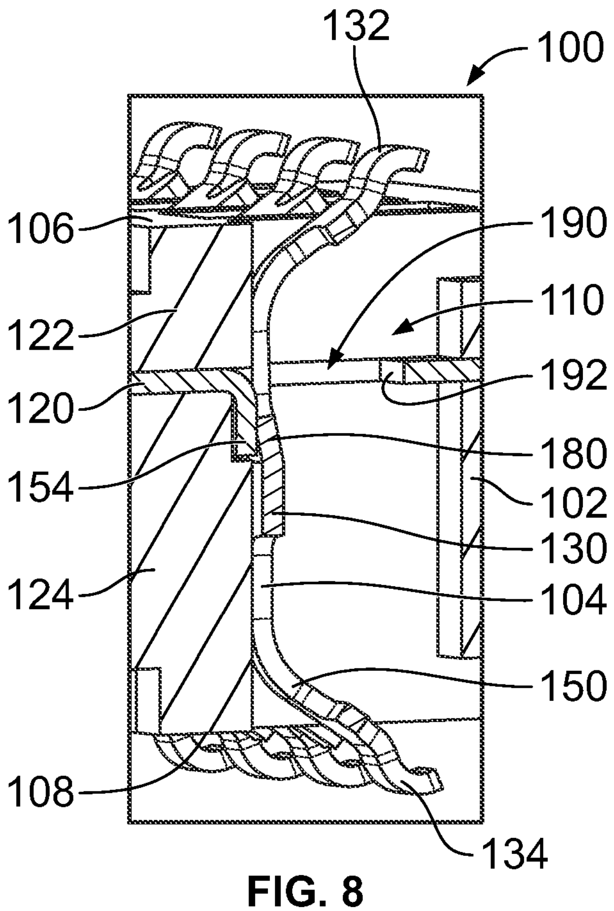
FIG. 8 is a perspective, partial sectional view of a portion of the socket connector in accordance with an exemplary embodiment.

FIG. 7 is a perspective, partial sectional view of a portion of the socket connector 100 in accordance with an exemplary embodiment. FIG. 8 is a perspective, partial sectional view of a portion of the socket connector 100 in accordance with an exemplary embodiment. FIGS. 7 and 8 illustrate a plurality of the socket contacts 104 arranged in corresponding contact channels 110 of the substrate 102. FIGS. 7 and 8 illustrate the ground plane 120 at the interior of the substrate 102. The ground plane 120 is configured to be electrically connected to corresponding ground socket contacts 150.

The ground plane 120 is located between the upper dielectric layer 122 and the lower dielectric layer 124. In an exemplary embodiment, the ground plane 120 includes openings 190 that receive the socket contacts 104. The openings 190 are defined by edges 192 that surround the openings 190, such as on four sides. The openings 190 may be formed by a stamping process during manufacture of the ground plane 120. However, the openings 190 may be formed by other processes, such as cutting, etching, or other processes. The openings 190 may be generally rectangular; however, the openings 190 may have other shapes in alternative embodiments. The openings 190 may be sized and shaped similar to the contact channels 110. The openings 190 are aligned with the contact channels 110.

In an exemplary embodiment, the ground plane 120 includes the connecting tabs 154. In various embodiments, the connecting tabs 154 are stamped and formed from the ground plane 120. The connecting tabs 154 extend into the openings 190 that receive the ground socket contacts 150. For example, the connecting tabs 154 extend from one of the edges 192 into the opening 190 to interface with the ground socket contact 150. The connecting tab 154 interfaces with the connecting tab 180 of the ground socket contact 150 in an exemplary embodiment. In the illustrated embodiment, the connecting tabs 154 are bent downward from the ground plane 122 extend along the rear of the contact channel 110. The connecting tab 154 exposed within the contact channel 110 to interface with the ground socket contact 150. In an exemplary embodiment, the connecting tabs 180 of the ground socket contacts 150 is deflectable and configured to be spring biased against the connecting tab 154 to ensure and electrical connection is maintained between the ground socket contact 150 and the ground plane 120. In various embodiments, when the upper and lower mating beams 132, 134 are compressed, the contact body 130 is flexed rearward to press the connecting tabs 180 toward the connecting tab 154. In an exemplary embodiment, the ground plane 120 is positioned between the upper surface 106 and the lower surface 108 such that the connecting tab 154 is approximately centered between the upper surface 106 and the lower surface 108.

Figure 9:
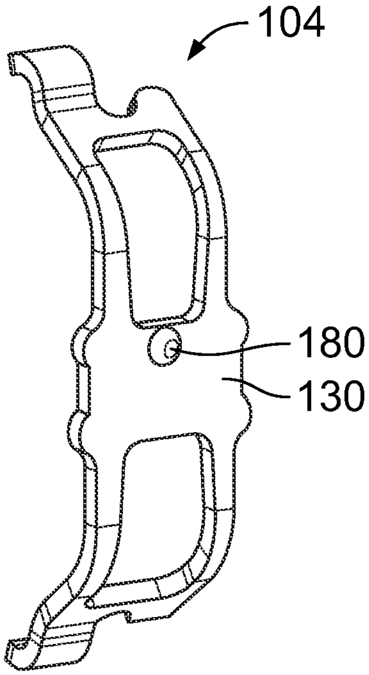
FIG. 9 is a rear perspective view of the socket contact in accordance with an exemplary embodiment.

FIG. 9 is a rear perspective view of the socket contact 104 in accordance with an exemplary embodiment. The socket contact 104 includes the connecting tab 180 along the contact body 130. In the illustrated embodiment, the connecting tabs 180 is a bump, dimple or protrusion extending rearwardly from the contact body 130 rather than being a deflectable tab as shown in FIGS. 5 and 6.

Figure 10:
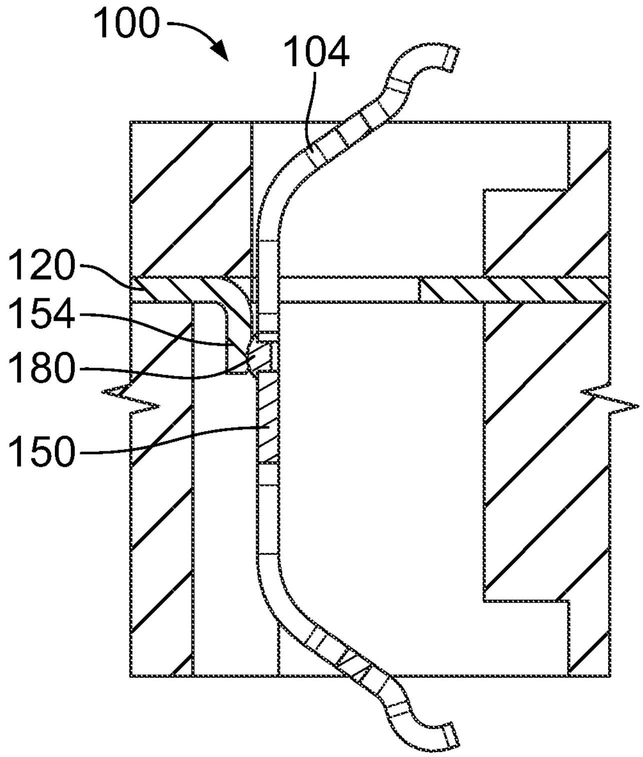
FIG. 10 is a cross-sectional view of a portion of the socket connector in accordance with an exemplary embodiment showing the socket contact illustrated in FIG. 9.
Figure 11:
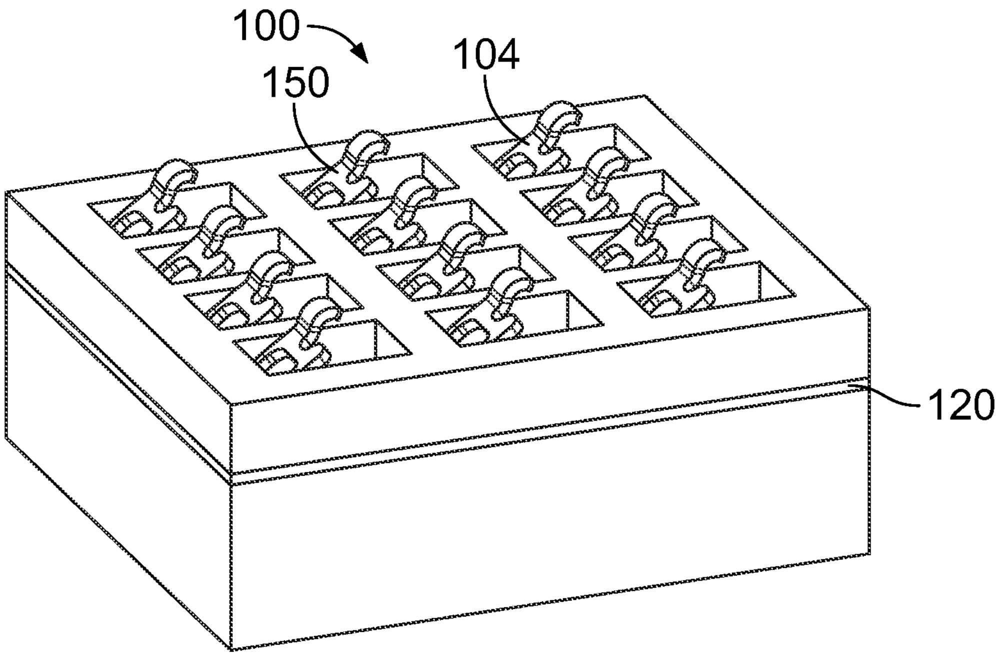
FIG. 11 is a perspective, partial sectional view of a portion of the socket connector in accordance with an exemplary embodiment showing the socket contact illustrated in FIG. 9.

FIG. 10 is a cross-sectional view of a portion of the socket connector 100 in accordance with an exemplary embodiment showing the socket contact 104 illustrated in FIG. 9. FIG. 11 is a perspective, partial sectional view of a portion of the socket connector 100 in accordance with an exemplary embodiment showing the socket contact 104 illustrated in FIG. 9. The ground socket contact 150 is configured to be electrically connected to the ground plane 120. The connecting tab 180 of the ground socket contact 150 interfaces with the connecting tab 154 of the ground plane 120. In various embodiments, the connecting tab 154 may be forward biased against the connecting tabs 180 to maintain electrical connection between the ground socket contact 150 and the ground plane 120.

Figure 12:
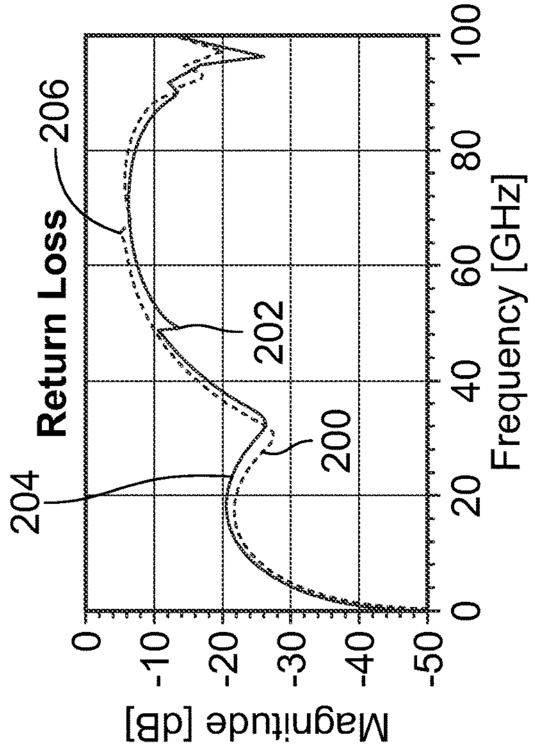
FIG. 12 is a graph illustrating return loss of the socket connector including the ground plane compared to return loss of a conventional socket connector that does not include an internal ground plane in accordance with an exemplary embodiment.

FIG. 12 is a graph illustrating return loss 200 of the socket connector 100 including the ground plane 120 compared to return loss 202 of a conventional socket connector that does not include an internal ground plane. The results show an improvement in return loss electrical performance in the socket connector 100 including the ground plane 120. For example, the return loss 202 of the conventional socket connector has a dip 204 at approximately 50 GHz, whereas the return loss 200 of the socket connector 100 including the ground plane 120 has a dip 206 at approximately 65 GHz. As such, the electrical performance of socket connector 100 including the ground plane 120 is improved and may be operated in a target frequency, such as 60 GHz, more efficiently than the conventional socket connector.

Figure 13:
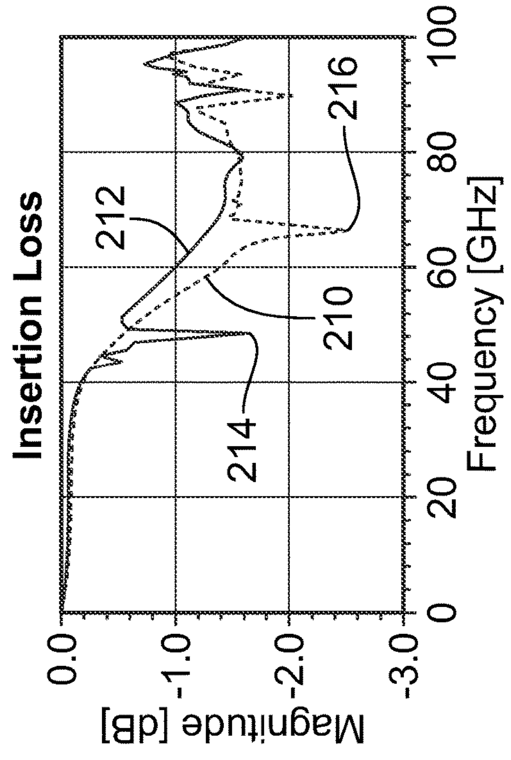
FIG. 13 is a graph illustrating insertion loss of the socket connector including the ground plane compared to insertion loss of a conventional socket connector that does not include an internal ground plane in accordance with an exemplary embodiment.

FIG. 13 is a graph illustrating insertion loss 210 of the socket connector 100 including the ground plane 120 compared to insertion loss 212 of a conventional socket connector that does not include an internal ground plane. The results show an improvement in insertion loss electrical performance in the socket connector 100 including the ground plane 120. For example, the insertion loss 212 of the conventional socket connector has a dip 214 at approximately 50 GHz, whereas the insertion loss 210 of the socket connector 100 including the ground plane 120 has a dip 216 at approximately 65 GHz. As such, the electrical performance of socket connector 100 including the ground plane 120 is improved and may be operated in a target frequency, such as 60 GHz, more efficiently than the conventional socket connector.

Figure 14:
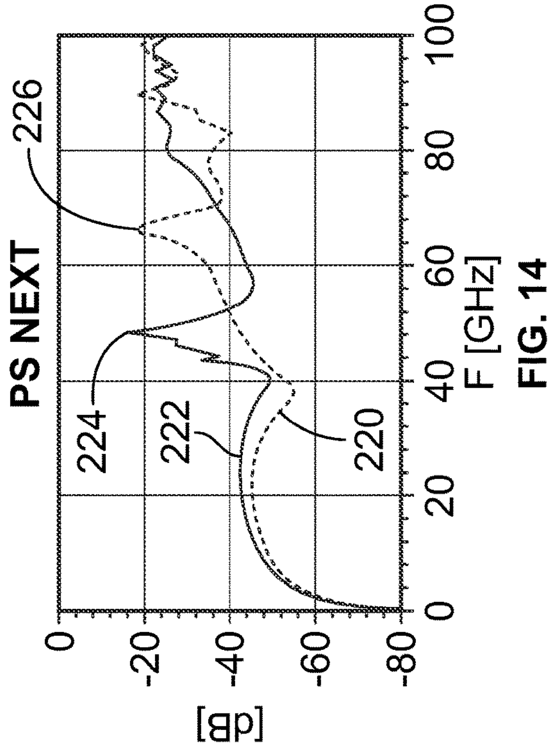
FIG. 14 is a graph illustrating near end cross talk of the socket connector including the ground plane compared to near end cross talk of a conventional socket connector that does not include an internal ground plane in accordance with an exemplary embodiment.

FIG. 14 is a graph illustrating near end cross talk 220 of the socket connector 100 including the ground plane 120 compared to near end cross talk 222 of a conventional socket connector that does not include an internal ground plane. The results show an improvement in near end cross talk electrical performance in the socket connector 100 including the ground plane 120. For example, the near end cross talk 222 of the conventional socket connector has a peak 224 at approximately 50 GHz, whereas the near end cross talk 220 of the socket connector 100 including the ground plane 120 has a peak 226 at approximately 70 GHz. As such, the electrical performance of socket connector 100 including the ground plane 120 is improved and may be operated in a target frequency, such as 60 GHz, more efficiently than the conventional socket connector.

Figure 15:
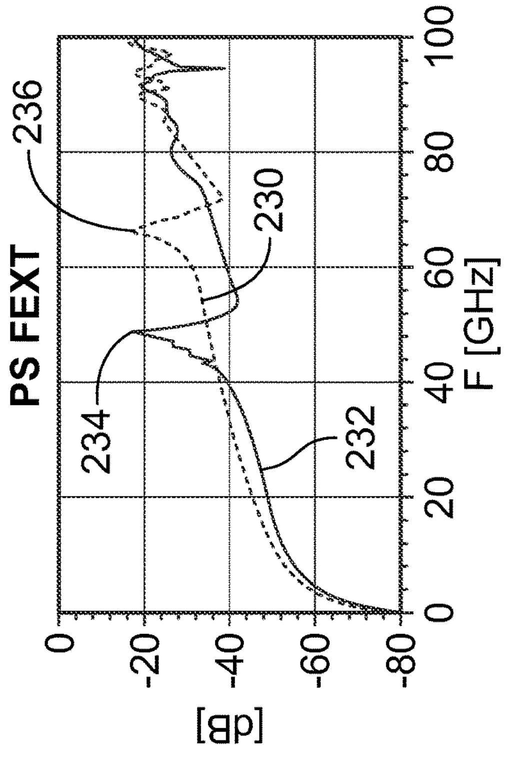
FIG. 15 is a graph illustrating far end cross talk of the socket connector including the ground plane compared to far end cross talk of a conventional socket connector that does not include an internal ground plane in accordance with an exemplary embodiment.

FIG. 15 is a graph illustrating far end cross talk 230 of the socket connector 100 including the ground plane 120 compared to far end cross talk 232 of a conventional socket connector that does not include an internal ground plane. The results show an improvement in far end cross talk electrical performance in the socket connector 100 including the ground plane 120. For example, the far end cross talk 232 of the conventional socket connector has a peak 234 at approximately 50 GHz, whereas the far end cross talk 230 of the socket connector 100 including the ground plane 120 has a peak 236 at approximately 65 GHz. As such, the electrical performance of socket connector 100 including the ground plane 120 is improved and may be operated in a target frequency, such as 60 GHz, more efficiently than the conventional socket connector.

Figure 16:
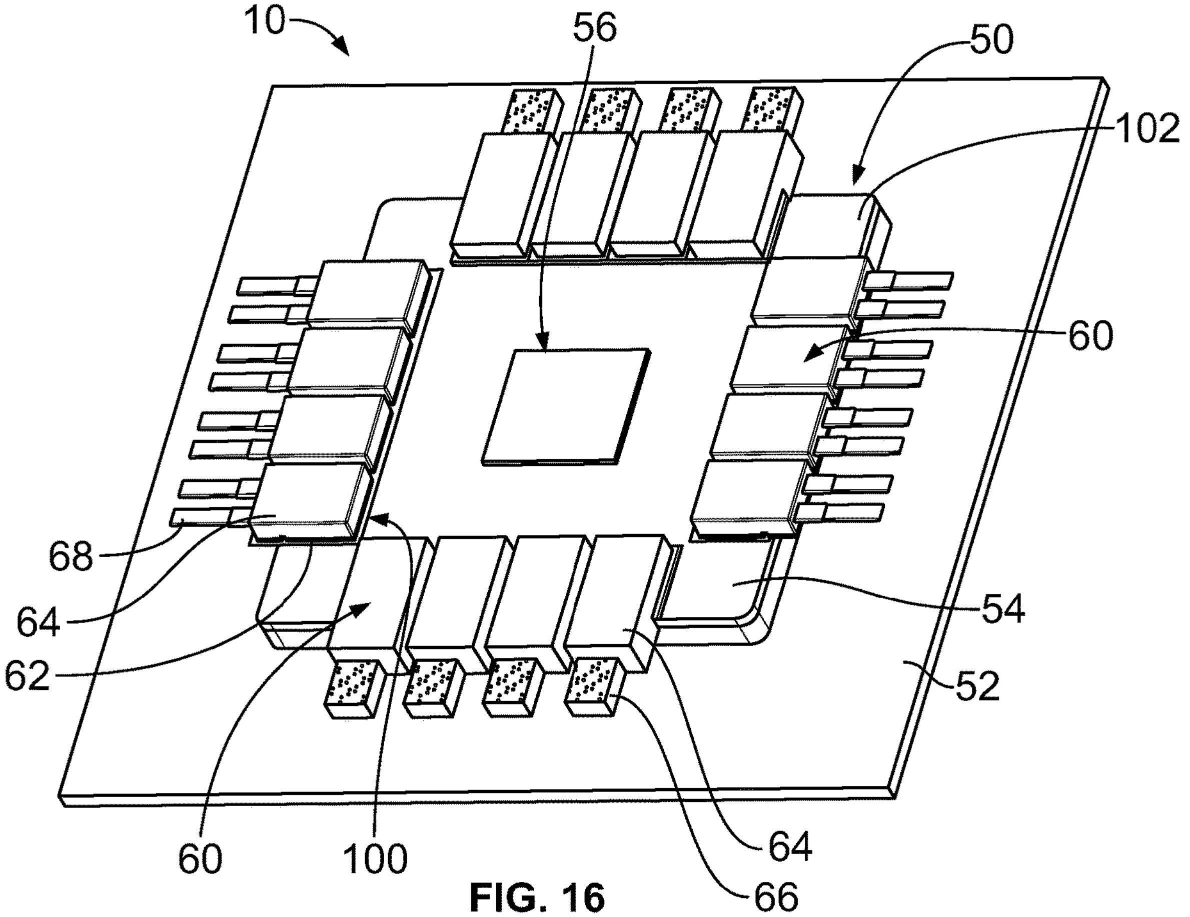
FIG. 16 illustrates an exemplary embodiment of the electronic assembly in accordance with an exemplary embodiment.
Figure 17:
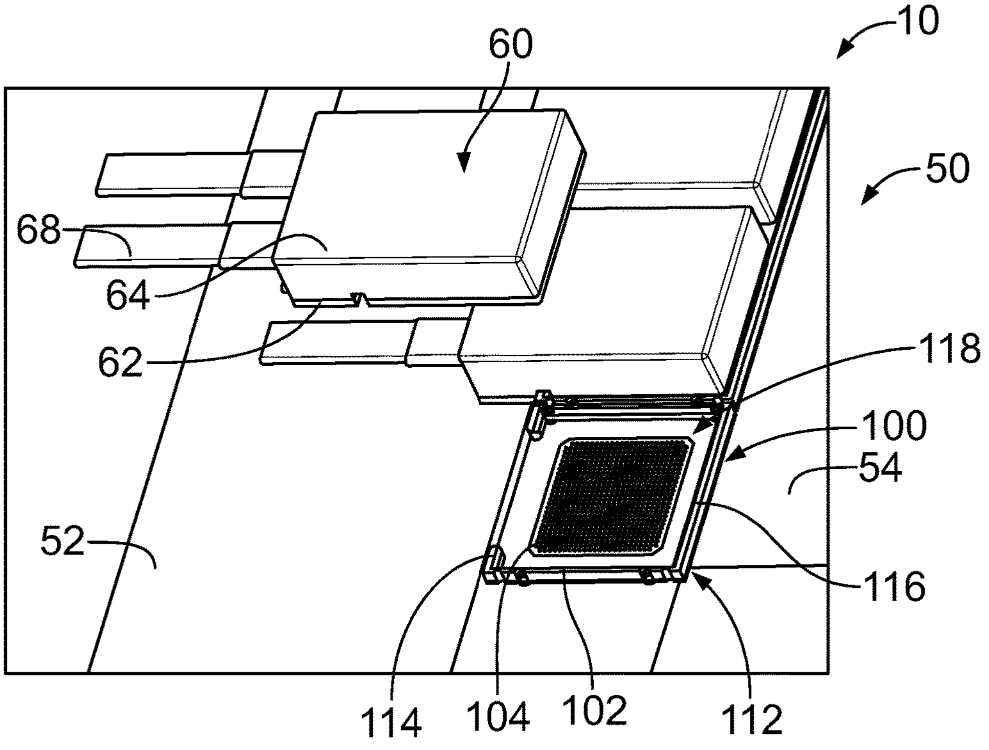
FIG. 17 illustrates a portion of the electronic assembly shown in FIG. 16 in accordance with an exemplary embodiment.

FIG. 16 illustrates an exemplary embodiment of the electronic assembly 10. FIG. 17 illustrates a portion of the electronic assembly 10 shown in FIG. 16. The electronic assembly 10 includes an electronic module 50 coupled to a host circuit board 52, such as for data and/or power transfer between the electronic module 50 and the host circuit board 52. Pluggable modules 60 are coupled to the electronic module 50, such as for data and/or power transfer between the pluggable modules 60 and the electronic module 50. FIG. 17 shows one of the pluggable modules 60 poised for coupling to the electronic module 50.

In an exemplary embodiment, a plurality of the socket connectors 100 are coupled to a module substrate 54 of the electronic module 50. The electronic module 50 includes an electronic package 56 coupled to the module substrate 54. The socket connectors 100 are arranged around the electronic package 56, such as on all four sides of the electronic package 56, to electrically connect a plurality of the pluggable modules 60 to the electronic package 56. For example, the module substrate 54 includes circuits, traces, vias, pads or other conductors to electrically connect the socket connectors 100 to the electronic package 56. The electronic package 56 may be a central processing unit (CPU), a microprocessor, a memory module, an integrated circuit, a chip, a network switch or the like. Optionally, multiple electronic devices, or other types of components, may be mounted to the module substrate 54. The electronic package 56 may be soldered directly to contacts on the module substrate 54. Alternatively, the electronic package 56 may be coupled to the module substrate 54 through an interposer or socket connector.

During assembly, the pluggable modules 60 are plugged into the corresponding socket connectors 100 to electrically connect the pluggable modules 60 to the electronic package 56. In various embodiments, the pluggable modules 60 may be high speed cable connectors. In other various embodiments, the pluggable modules 60 may be fiber optic transceivers. Optionally, both high speed cable connectors and fiber optic transceivers may be coupled to the module substrate 54 through corresponding socket connectors 100. The pluggable modules 60 include circuit boards 62 having contact pads (not shown) configured to be mated with the socket connectors 100 via separable mating interfaces. The circuit board 62 may be held by a housing 64. Cables 66 or optical fibers 68 may extend from the housing 64 to another device or component. A separate device, such as a pluggable module holder or heat sink (not shown), may be used to press and hold the pluggable modules 60 downward to electrically connect the pluggable modules 60 to the socket connectors 100. The heat sink may be coupled to the tops of the pluggable modules 60 to dissipate heat from the pluggable modules 60.

In the illustrated embodiment, the electronic package 56 is an application specific integrated circuit (ASIC). The socket connectors 100 are mounted to the module substrate 54, such as at the top surface, to allow connection of the pluggable modules 60 directly to the module substrate 54 for electrical connection to the electronic package 56. In an exemplary embodiment, the electronic package 56 is electrically connect to the host circuit board 52 through the module substrate 54.

In an exemplary embodiment, the socket connector 100 includes a socket housing 112 holding the substrate 102. The socket housing 112 includes a socket frame 114 that surrounds the substrate 102. The substrate 102 holds the socket contacts 104 relative to the socket frame 114. For example, the substrate 102 may hold the socket contacts 104 arrayed together, such as in a 25×25 array, 100×100 arrays, or other size. In an exemplary embodiment, the socket contacts 104 are arranged in a contact array having a predetermined pattern, such as in rows and columns. The socket frame 114 includes frame members 116 forming a socket opening 118 that receives the pluggable module 60. The frame members 116 locate the pluggable module 60 in the socket opening 118. The socket frame 114 is configured to be coupled to the module substrate 54. The socket frame 114 may operate as an anti-overstress load bearing member that stops or limits compression of the socket contacts 104.

In an exemplary embodiment, the socket contacts 104 are stamped and formed contacts. The socket contacts 104 form a compressible, separable interface with the pluggable module 60. For example, the pluggable module 60 has a mating interface having a plurality of the contact pads that engage the socket contacts 104. The socket contacts 104 from a compressible, separable interface with the module substrate 54. For example, the module substrate 54 has a mating interface having a plurality of the contact pads that engage the socket contacts 104.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A socket connector comprising:

a substrate having an upper surface and a lower surface, the substrate having a ground plane between the upper surface and the lower surface, the substrate including contact channels between the upper and lower surfaces; and socket contacts received in corresponding contact channels, each socket contact including a contact body extending along a plane, an upper mating element extending from the contact body outside of the plane of the contact body, and a lower mating element extending from the contact body outside of the plane of the contact body, the upper mating element deflectable relative to the contact body and extending to the upper surface to interface with a first electrical component, the lower mating element deflectable relative to the contact body and extending to the lower surface to interface with a second electrical component, wherein a plurality of the socket contacts include at least one grounding element extending from the plane of the contact body to interface with the ground plane outside of the plane of the contact body, the grounding elements are electrically connected to the ground plane, wherein a plurality of the socket contacts do not include grounding elements.

2. The socket connector of claim 1, wherein the ground plane is approximately centered between the upper surface and the lower surface.

3. The socket connector of claim 1, wherein the substrate has a substrate footprint, the ground plane having a ground plane footprint having a surface area approximately equal to the substrate footprint.

4. The socket connector of claim 1, wherein the substrate is a layered structure, the substrate including an upper dielectric layer above the ground plane and a lower dielectric layer below the ground plane.

5. The socket connector of claim 1, wherein the ground plane includes a metal plate stacked between two dielectric layers.

6. The socket connector of claim 1, wherein the grounding element includes a connecting tab being bent out of the plane of the contact body for directly engaging the ground plane to electrically connect the socket contacts to the ground plane.

7. The socket connector of claim 6, wherein the contact body extends between a first side and a second side, the connecting tab being located between the first side and the second side.

8. The socket connector of claim 1, wherein the ground plane includes openings, the socket contacts passing through the openings.

9. The socket connector of claim 8, wherein the ground plane includes edges defining the openings, the ground plane including connecting tabs extending from the edges into the openings to interface with corresponding ground socket contacts.

10. The socket connector of claim 1, wherein the socket contacts include signal socket contacts and ground socket contacts, the signal socket contacts being electrically isolated from the ground plane, the ground socket contacts being electrically connected to the ground plane.

11. The socket connector of claim 10, wherein the signal socket contacts are arranged in pairs, the ground socket contacts surrounding the pairs of signal socket contacts.

12. The socket connector of claim 10, wherein the ground plane includes signal openings receiving the signal socket contacts and ground openings receiving the ground socket contacts, the ground plane being spaced apart from the signal socket contacts in the signal openings, the ground plane interfacing with the ground socket contacts in the ground openings.

13. The socket connector of claim 1, wherein the upper mating elements are electrically connected to the first electrical component at an upper ground plane and the lower mating elements are electrically connected to the second electrical component at a lower ground plane, the ground plane being approximately centered between the upper ground plane and the lower ground plane.

14. The socket connector of claim 1, wherein the ground plane extends parallel to, and spaced apart from, the upper surface and the lower surface.

15. The socket connector of claim 1, wherein the ground plane pushes insertion loss frequencies and return loss frequencies for the socket connector above 60 GHz.

16. A socket connector comprising:

a substrate having an upper surface and a lower surface, the substrate having a ground plane between the upper surface and the lower surface, the substrate including contact channels between the upper and lower surfaces; and ground socket contacts received in corresponding contact channels, each ground socket contact including a contact body extending along a plane, an upper mating element extending from the contact body outside of the plane of the contact body, and a lower mating element extending from the contact body outside of the plane of the contact body, and a grounding element extending from the contact body outside of the plane of the contact body to interface with the ground plane, the grounding element extending from the plane of the contact body to interface with the ground plane outside of the plane of the contact body, the upper mating element deflectable relative to the contact body and extending to the upper surface to interface with a first electrical component, the lower mating element deflectable relative to the contact body and extending to the lower surface to interface with a second electrical component;

wherein the ground plane electrically commons the ground socket contacts.

17. A socket connector comprising:

a substrate having a ground plane, an upper substrate portion above the ground plane, and a lower substrate portion below the ground plane, the upper substrate portion having an upper surface configured to face a first electrical component, the lower substrate portion having a lower surface configured to face a second electrical component, the substrate including signal channels therethrough and ground channels therethrough;

signal socket contacts received in corresponding signal channels, each signal socket contact including a signal contact body, an upper signal mating element, and a lower signal mating element, the signal contact body coupled to at least one of the upper substrate portion and the lower substrate portion, the upper signal mating element deflectable relative to the contact body and extending to the upper surface to interface with the first electrical component, the lower signal mating element deflectable relative to the contact body and extending to the lower surface to interface with the second electrical component; and ground socket contacts received in corresponding ground channels, each ground socket contact including a ground contact body extending along a plane, an upper ground mating element extending from the contact body outside of the plane of the contact body, and a lower ground mating element extending from the contact body outside of the plane of the contact body, the ground contact body including a grounding element extending from the contact body outside of the plane of the contact body, the grounding element being electrically connected to the ground plane, the upper ground mating element deflectable relative to the contact body and extending to the upper surface to interface with the first electrical component, the lower ground mating element deflectable relative to the contact body and extending to the lower surface to interface with the second electrical component;

wherein the signal socket contacts do not include grounding elements.

18. The socket connector of claim 17, wherein the ground plane is approximately centered between the upper surface and the lower surface.

19. The socket connector of claim 17, wherein the upper substrate portion includes an upper dielectric layer and the lower substrate portion includes a lower dielectric layer, the ground plane being stacked between the upper dielectric layer and the lower dielectric layer.

20. The socket connector of claim 17, wherein the signal socket contacts and the ground socket contacts are shaped identical except for the inclusion of the grounding element on the ground socket contact.

* * * * *